Figure 1:
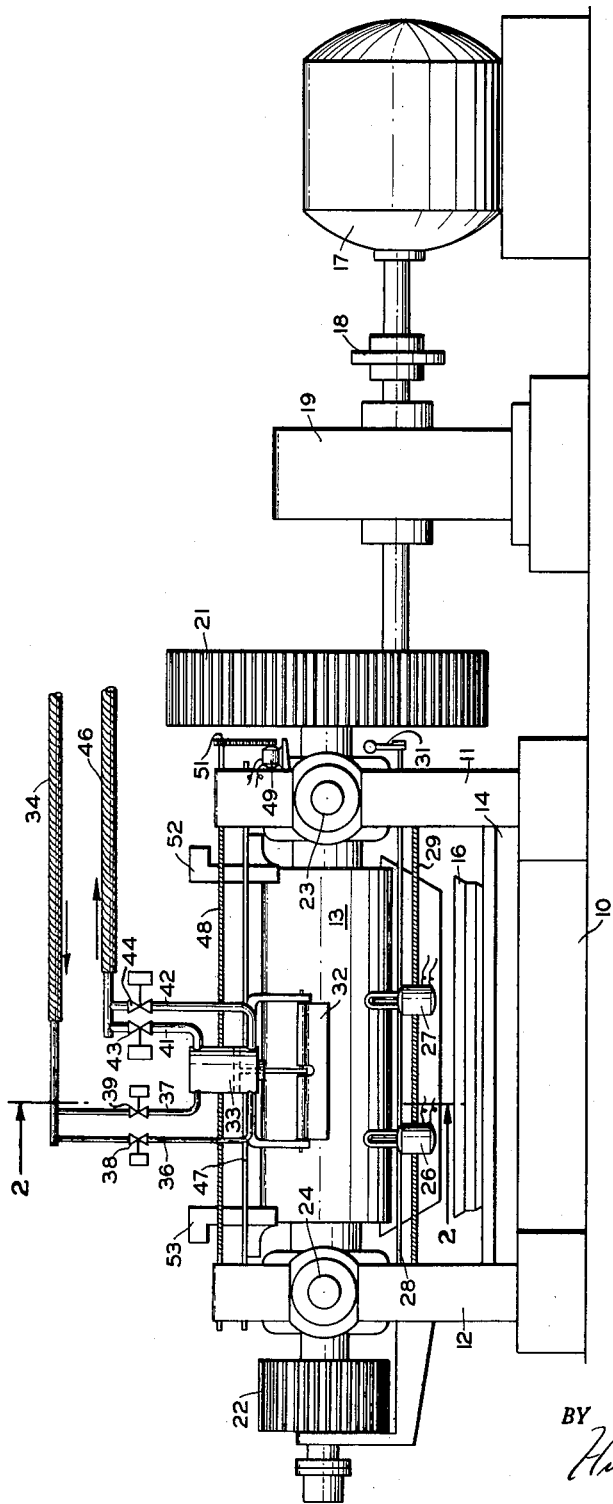

March 7, 1961  J. W. HURST  2,973,549
HORIZONTAL CUTTER AND TAKE-OFF DEVICE
Filed June 29, 1956  2 Sheets-Sheet 1

INVENTOR.
J. W. HURST
BY
Hudson and Young
ATTORNEYS

March 7, 1961  J. W. HURST  2,973,549
HORIZONTAL CUTTER AND TAKE-OFF DEVICE
Filed June 29, 1956  2 Sheets-Sheet 2

INVENTOR.
J. W. HURST

BY
Hudson and Young
ATTORNEYS

United States Patent Office 2,973,549
Patented Mar. 7, 1961

2,973,549

HORIZONTAL CUTTER AND TAKE-OFF DEVICE

James W. Hurst, McGregor, Tex., assignor to Phillips Petroleum Company, a corporation of Delaware Filed June 29, 1956, Ser. No. 595,005

4 Claims. (Cl. 18—2)

This invention relates to apparatus for use in handling rubbery compositions and the like. In a further aspect, this invention relates to a horizontal cutter and take-off device for two-roll mills.

In the handling of rubber and rubbery compositions, one of the basic pieces of equipment used is a two-roll mill. Such mills are used in many different operations such as mixing, sheeting, strip feeding and the like. It has long been the practice to use such mills provided with knives to cut strips running lengthwise from such mills. Prior practice has been to use such knives to cut the strip vertical and to make the horizontal cuts manually.

Rubber and plastic binders are now extensively used in the preparation of solid rocket propellants, such propellants containing large amounts of suitable oxidants such as ammonium nitrate, ammonium perchlorate, and other solid oxidants of this type which supply large amounts of oxygen. The binder for this solid oxidant most commonly used at the present time, is a rubbery composition and this can be natural rubber and synthetic polymers of conjugated dienes, these synthetic polymers including synthetic copolymers of the dienes with other monomers polymerizable therewith such as styrene, alphamethylstyrene, acrylonitrile, methylvinyl-pyridine, vinyl ethers, esters, alcohols, and the like. The usual milling process is to mill the rubber on a roll mill while adding the solid oxidant thereto. Many additional ingredients are present in the composition, such as burning rate catalysts, antioxidants, curing agents, plasticizers, curing agent accelerators, and the like.

The manual operation for the production of strips from two-roll mills has been quite satisfactory in prior operation. However, because of the high oxidant level in these compositions, there is some danger of explosion and it is necessary to provide remote control operation for the production of such propellants. My invention concerns apparatus for the remote control operation of a two-roll mill.

Therefore, the following are objects of my invention.

An object of my invention is to provide improved apparatus for cutting strips from a roll mill. A further object of my invention is to provide apparatus for cutting these strips which can be entirely operated from a remote position. A further object of my invention is to provide a method of cutting vertical strips of material from a roll mill. A further object of my invention is to provide a method of preparing propellant compositions.

Figure 2:
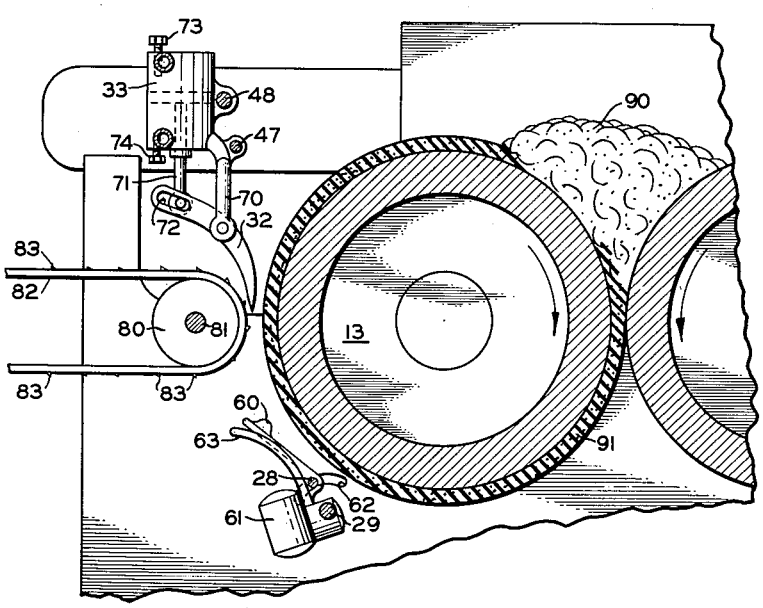
Figure 3:
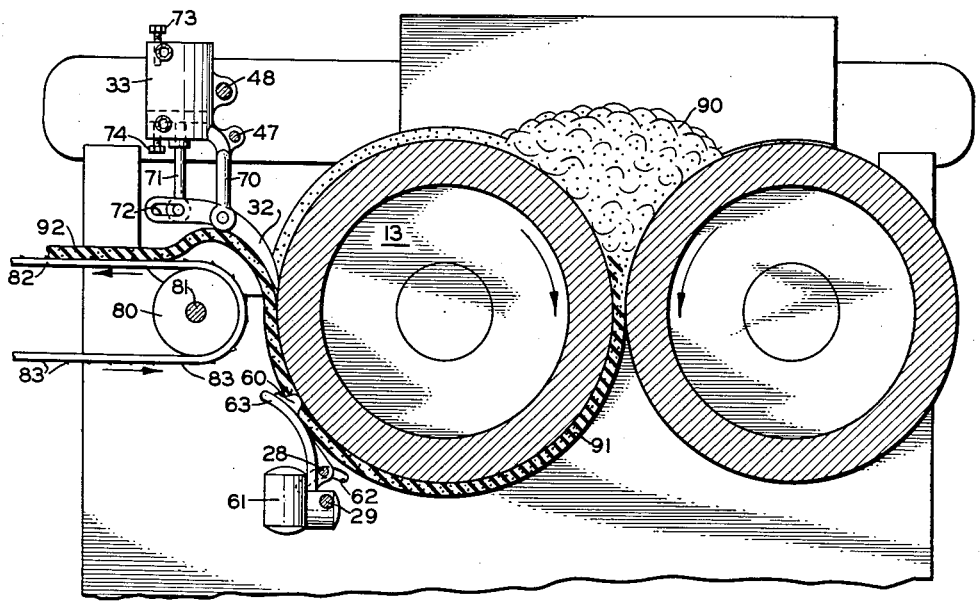

Other objects and advantages of my invention will be apparent to one skilled in the art upon reading the accompanying disclosure which includes a drawing comprising Figure 1, a side elevational view of a two-roll mill embodying my invention;

Figure 2, a cross-section on line 2—2 of Figure 1, showing the knife blades in non-cutting position; and Figure 3, a cross-section on line 2—2 of Figure 1 with the blades in a position to cut a strip from the mill.

My invention is directed to the use of a combination of cutting members for use with a roll mill and the provision of automatic and remotely controlled means for operating these cutting members. More particularly, I provide a plurality of cutting members operable to cut vertically along one of the rolls and at least one horizontal cutting member attached to cut across the face of one of the roll members. In addition, a take-off belt is provided to convey pieces cut from the roll to a remote location for further processing, as required. This will become more apparent in connection with the detailed description of the drawing which follows.

Directing attention to Figure 1, which is a side elevational view of the mill, the bed plate is indicated at 10, it being understood that this bed plate extends to a back support member (not shown). Mounted upon bed plate 10 are end frame members 11 and 12, these supporting the rolls, the front roll 13 being shown. Under the rolls, there is provided a support 14 and a mill pan 16. The rolls are driven by motor 17 connecting thereto by means of coupling 18, speed reducer 19, drive gear 21 and connecting gears 22, a second gear being provided behind gear 22 to drive the second or back roll. The spacing between the rolls is varied by means of adjusting screws 23 and 24.

To cut the vertical strips, there are provided a plurality, two being shown, of strip cutters, 26 and 27. These strip cutters, more fully described in connection with Figures 2 and 3, ride upon guide bar 28 and are moved by gears which are threaded upon stationary screw 29. Each of these strip cutters includes an electrically powered motor which is used to move the cutters parallel to the axis of roll 13, this providing for adjustment of the width of the strip removed. Guide bar 28 rides in a slot (62 in Figures 2 and 3) in frame members 11 and 12 and is moved backward and forward by means of lever 31, this being connected by means (not shown) for remote control operation.

Also provided is a horizontal cutter, this including a blade 32 movable into and out of contact with roll 13 by hydraulic means including cylinder 33 provided with a piston connected to blade 32. Conduit 34 provides the input hydraulic pressure to the desired side of hydraulic cylinder 33 by means of conduits 36 and 37, the flow thereto being controlled by electrically controlled solenoid valves 38 and 39. Flow from cylinder 33 is alternatively through conduits 41 and 42, the flow through being controlled by electrically operated solenoid valves 43 and 44. The material exhausted from cylinder 33 is removed by means of conduit 46. Preferably, conduits 41 and 42 are larger than conduits 36 and 37 in order to provide rapid action of cylinder 33 and, consequently, blade 32. This is preferred because it gives rapid and strenuous cutting action. Blade 32 is supported by support rod 47 and positioned longitudinally along roll 13 by means of driven screw 48. To drive driven screw 48, I have provided a motor 49 connected by a chain drive 51 to driven screw 48. By this means, blade 32 can be positioned at any point between material guide members 52 and 53. Obviously, a plurality of these blades 32 could be provided but my invention is amply illustrated by showing one such member.

Directing attention to Figures 2 and 3, the operation of this apparatus will become more evident and the specific structure of the cutting means being more specifically set forth. The same numbers, where possible, are used to designate the elements on these latter two figures. Figure 2 shows apparatus as the composition is being milled prior to the removal of strips. The knife assemblies for cutting the strip vertically are shown mounted upon stationary screw 29 and, in this view, the knife blade 60 is not in contact with the roll, having been retracted by operation of guide bar 28. Operation of motor 61 positions the knife assembly where desired. Guide bar 28 rides in slot 62, this providing for movement of the knife into and out of engagement with roll 13. Positioned around knife blade 60 is knife guard 63. Take off blade 32 is also shown retracted in Figure 2, this blade being pivoted on support arm 70 attached to cylinder 33 which is supported on support rod 47 and driven by screw 48. The piston rod 71 extends into a slot 72 in blade 32. Hydraulic cylinder 33 is provided with set screws 73 and 74. These set screws are provided to limit the travel of the piston in hydraulic cylinder 33, this travel limiting mechanism being provided to compensate for the change in relationship between blade 32 and roll 13 as blade 32 is sharpened.

Positioned adjacent roll 13 is a driven roll 80 mounted on axis 81, this roll carrying a belt 82. Belt 82 is covered with small projections 83, preferably spaced at random thereon. These projections facilitate movement of the material by the belt.

In this figure, the material is being milled, a bank 90 being shown and a layer 91 of a predetermined thickness shown on mill 13.

In Figure 3, the cutting members have been moved into position and a strip 92 is shown being removed from mill 13. This strip removal is performed by moving knive 60 into contact with the roll and moving knife 32 in contact therewith. The material is forced from the roll by knife 32 and falls onto belt 82. When a strip of the proper length has been cut the knife assemblies are removed from contact with mill 12 and the milling is continued.

For the operation of this cutting means, an important feature is the rapidity with which take-off blade approaches the mill. In order to cut through the material on the mill, a quick snap of the blade is required. Also, it is important to synchronize the operation of the take-off device and the speed of the mill roll to prevent falling apart or stacking up of the strip in the blade area.

An advantage of my apparatus is that the operator can position the cutters to remove material from any location on the roll mill or that the cutters can move continuously back and forth along the length thereof.

As many possible embodiments may be made of this invention without departing from the scope thereof, it is to be understood that all matter herein set forth or shown in the accompanying drawings is to be interpreted as illustrative and not as unduly limiting my invention.

I claim:

1. In combination with a roll mill having frame members supporting the rolls thereof, a stationary screw extending between said frame members parallel to said rolls; a plurality of first knife assemblies mounted on said screw, each of said first knife assemblies comprising a gear box, the gears of which operatively engage said screw, a driving motor, and a vertical knife blade adapted to contact one of said rolls; a guide bar connecting said knife assemblies and extending through said frame members; a support rod parallel to said rolls mounted in said frame above said first knife assemblies; a driven screw mounted adjacent and parallel to said support rod; means to drive said driven screw; a second knife assembly mounted on said support rod and driven by said driven screw, said second knife assembly comprising a hydraulic cylinder, fluid material supply and exhaust conduits connected to said hydraulic cylinder, solenoid valves in said supply and removal conduits, support arms, a horizontal knife blade pivotally connected to said support arms, and a piston rod extending from said hydraulic cylinder to said knife blade adapted to move said knife blade into and out of contact with the roll contacted by the vertical knife blades; and a take-off belt positioned adjacent said horizontal knife blade adapted to convey material cut from the mill by said horizontal knife blade, said take-off belt being provided with a plurality of small projections thereon.

2. In combination with a roll mill having frame members supporting the rolls thereof, a stationary screw extending between said frame members parallel to said roll; a plurality of first knife assemblies mounted on said screw, each of said first knife assemblies comprising a gear box, the gears of which operatively engage said screw, a driving motor, and a vertical knife blade adapted to contact one of said rolls; a guide bar connecting said knife assemblies and extending through said frame members; a support rod parallel to said rolls mounted in said frame above said first knife assemblies; a driven screw mounted adjacent and parallel to said support rod; means to drive said driven screw; and a second knife assembly mounted on said support rod and driven by said driven screw, said second knife assembly comprising a hydraulic cylinder, fluid material supply and exhaust conduits connected to said hydraulic cylinder, solenoid valves in said supply and removal conduits, support arms, a horizontal knife blade pivotally connected to said support arms, and a piston rod extending from said hydraulic cylinder to said knife blade adapted to move said knife blade into and out of contact with the roll contacted by the vertical knife blades.

3. In combination with a roll mill having frame members supporting the rolls thereof, first support means extending between said frame members parallel to said rolls; a plurality of first knife assemblies mounted on said first support means, each of said first knife assemblies comprising a vertical knife blade and power operated means to move said assembly longitudinally of said first support means; means independent of the roller to move each said vertical knife blade positively into and out of contact with a roll; second support means separate from said first support means extending between said frame members parallel to said rolls; a second knife assembly mounted on said second support means, said second knife assembly comprising a horizontal knife blade and power operated means to move said assembly longitudinally of said second support means; and means independent of the rolls to move said horizontal knife blade positively into and out of contact with a roll; said means to move each said vertical knife blade into and out of contact with a roll being independent of said means to move said horizontal knife blade into and out of contact with a roll; and said means to move each said first knife assemblies longitudinally of said first support means being independent of said means to move said second knife assembly longitudinally of said second support means.

4. The combination of claim 3 including a take-off belt positioned adjacent said horizontal knife blade adapted to convey material cut from the mill by said horizontal knife blade.

References Cited in the file of this patent

UNITED STATES PATENTS

| Number | Name | Date |
|---|---|---|
| 442,878 | Geiger | Dec. 16, 1890 |
| 1,283,462 | Board | Nov. 5, 1918 |
| 1,383,133 | Lucke | June 28, 1921 |
| 1,701,889 | Junker | Feb. 12, 1929 |
| 1,798,806 | Pfeiffer | Mar. 31, 1931 |
| 2,150,174 | Lambert | Mar. 14, 1939 |
| 2,319,040 | Conklin | May 11, 1943 |
| 2,327,027 | Dohrenwend | Aug. 17, 1943 |
| 2,327,028 | Dohrenwend | Aug. 17, 1943 |
| 2,331,275 | Perry | Oct. 5, 1943 |
| 2,341,816 | Sandberg | Feb. 15, 1944 |
| 2,412,658 | Stuart et al. | Dec. 17, 1946 |
| 2,541,913 | Carter | Feb. 13, 1951 |
| 2,720,898 | Bush et al. | Oct. 18, 1955 |